United States Patent
Kim

(10) Patent No.: US 9,387,755 B2
(45) Date of Patent: Jul. 12, 2016

(54) SYSTEM AND METHOD FOR CONTROLLING CHARGING OF HYBRID VEHICLE

(71) Applicant: Hyundai Motor Company, Seoul (KR)

(72) Inventor: Sang-Jun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/562,969

(22) Filed: Dec. 8, 2014

(65) Prior Publication Data

US 2016/0082945 A1 Mar. 24, 2016

(30) Foreign Application Priority Data

Sep. 23, 2014 (KR) .................. 10-2014-0126827

(51) Int. Cl.
*B60W 20/00* (2016.01)
*B60K 6/48* (2007.10)
*B60L 11/18* (2006.01)
*B60W 10/02* (2006.01)
(Continued)

(52) U.S. Cl.
CPC . *B60K 6/48* (2013.01); *B60K 6/442* (2013.01); *B60L 11/1861* (2013.01); *B60W 10/02* (2013.01); *B60W 10/06* (2013.01); *B60W 10/08* (2013.01); *B60W 10/26* (2013.01); *B60W 20/00* (2013.01); *B60W 20/106* (2013.01); *B60W 20/13* (2016.01); *B60W 20/40* (2013.01); *B60W 30/18072* (2013.01); *B60K 2006/4825* (2013.01); *B60W 2510/244* (2013.01); *B60W 2710/0666* (2013.01); *B60W 2710/083* (2013.01); *Y10S 903/93* (2013.01)

(58) Field of Classification Search
CPC ... B60W 20/106; B60W 10/02; B60W 10/06; B60W 10/26; B60K 6/48; B60L 11/1861; Y10S 903/93
USPC .................. 701/22; 180/65.23, 65.27, 65.28, 180/65.285, 65.8; 903/918
See application file for complete search history.

(56) References Cited

U.S. PATENT DOCUMENTS

| 5,778,326 A | 7/1998 | Moroto et al. |
| 6,233,508 B1 * | 5/2001 | Deguchi ................. B60K 6/442 180/65.23 |

(Continued)

FOREIGN PATENT DOCUMENTS

| EP | 1526023 A2 | 4/2005 |
| EP | 2529990 A1 | 12/2012 |

(Continued)

*Primary Examiner* — Marthe Marc-Coleman
(74) *Attorney, Agent, or Firm* — Mintz Levin Cohn Ferris Glovsky and Popeo, P.C.; Peter F. Corless

(57) ABSTRACT

A method and system for controlling charging of a hybrid vehicle are provided. The method includes generating a request to charge a battery by driving a hybrid starter generator (HSG) with power of an engine in an electric vehicle (EV) mode of the hybrid vehicle. In addition, the method includes decreasing torque of the engine to HSG charging engine torque, maintaining the torque of the engine at the HSG charging engine torque, and shifting torque of the HSG into charging-target HSG torque. A pressure of a clutch disposed between the engine and a driving motor of the vehicle is released to interrupt transference of power from the engine to the driving motor. The battery is then charged with power output from the HSG while the HSG is rotating by driving power output from the engine.

3 Claims, 4 Drawing Sheets

(51) Int. Cl.
*B60W 10/06* (2006.01)
*B60W 10/26* (2006.01)
*B60K 6/442* (2007.10)
*B60W 10/08* (2006.01)
*B60W 30/18* (2012.01)

(56) References Cited

U.S. PATENT DOCUMENTS

| | | | |
|---|---|---|---|
| 2009/0166113 A1 | 7/2009 | Luo et al. | |
| 2012/0203417 A1* | 8/2012 | Matsui | B60K 6/48 701/22 |
| 2013/0297126 A1* | 11/2013 | Yamazaki | B60W 20/40 701/22 |
| 2014/0365051 A1* | 12/2014 | Gussen | F02N 11/0822 701/22 |

FOREIGN PATENT DOCUMENTS

| | | |
|---|---|---|
| FR | 2847638 A1 | 5/2004 |
| JP | 03-169203 | 7/1991 |
| JP | H07250404 A | 9/1995 |
| JP | 2008-279992 A | 11/2008 |
| JP | 2013-052802 A | 3/2013 |
| JP | 2013-071652 A | 4/2013 |
| KR | 10-1371476 | 3/2014 |
| WO | 2014/038442 A1 | 3/2014 |

* cited by examiner

SYSTEM AND METHOD FOR CONTROLLING CHARGING OF HYBRID VEHICLE

CROSS-REFERENCE TO RELATED APPLICATIONS

This application claims priority to Korean Patent Application No. 10-2014-0126827, filed on Sep. 23, 2014, which is incorporated herein by reference in its entirety.

BACKGROUND

1. Field of the Invention

Exemplary embodiments of the present invention relate to a system and method for controlling charging of a hybrid vehicle by operating a hybrid starter generator (HSG) in the hybrid vehicle; and particularly, to a method for controlling the charging of a hybrid vehicle to be charged using an HSG by operating a clutch that adjusts power between an engine and a motor to prevent deterioration of the system efficiency.

2. Description of Related Art

In a hybrid vehicle which travels using the power of an engine and a motor, as shown in FIG. 1, a clutch 13 is disposed between the engine 11 and the motor 12 to allow the engine 11 to selectively assist the power of the motor 12. In other words, when the clutch 13 is joined, the driving power of the engine 11 and the motor 12 is transferred to a driving wheel W through a transmission 14 and a final reduction gear 15 (e.g., an hybrid electric vehicle (HEV) mode); and when the clutch 13 is released, the power of the engine 11 is interrupted, and the driving power of the motor 12 is transferred to a driving wheel W through the transmission 14 and the final reduction gear 15 by the power charged in a battery 19 (e.g., an electric vehicle (EV) mode). In the HEV mode or the EV mode, power stored in the battery 19 is supplied to the motor 12 through an inverter 18.

The engine 11 is connected through a belt 17 or the like to a hybrid starter generator (HSG), configured to start the engine 11 or rotate by the engine 11 and charge the battery 19. In other words, the HSG 16 is configured to charge the battery 19 through the inverter 18 while generating electricity using the driving power of the engine 11 when the clutch 13 is released; and generate electricity to charge the battery 19 while maintaining the driving of the engine 11 when the clutch 13 is joined and the state of charge (SOC) of the battery 19 is substantially low.

Meanwhile, while the clutch 13 is being released for charging by the HSG 16, the efficiency may deteriorate. To release the clutch 13, actual torque output from the engine 11 is required to be adjusted to be zero, and the torque of the engine 11 should be increased to a torque of the charging load of the HSG 16 when the clutch 13 is released. However, in the procedure, the operating point of the engine remains in an inefficient section, thus deteriorating the efficiency. In other words, to prevent physical slip of the clutch 13, the pressure of the clutch 13 is released with fuel injection maintained for the input torque of the engine clutch to be zero, and then the torque of the engine 11 is adjusted to increase to torque capable of dealing coping with the charging torque of the HSG, wherein, in this procedure, as indicated by "A" in FIG. 2, the engine 11 is driven in a low-torque region, causing an inefficient section to occur.

SUMMARY

An exemplary embodiment of the present invention is directed to a system and method for controlling the charging of a hybrid vehicle, which may prevent an engine from operating in an inefficient section by increasing the driving torque of the engine to HSG driving torque capable of driving an HSG before a clutch disposed between the engine and a motor is released and then by releasing the clutch when the charging of a battery is required in the hybrid vehicle and the hybrid vehicle travels in an EV mode.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method for controlling charging of a hybrid vehicle may include: generating a request to charge a battery by driving a hybrid starter generator (HSG) with power of an engine in an electric vehicle (EV) mode of the hybrid vehicle; decreasing torque of the engine to HSG charging engine torque, which may be set as a level capable of coping with HSG charging torque, maintaining the torque of the engine at the HSG charging engine torque, and shifting torque of the HSG into charging-target HSG torque; releasing a pressure of a clutch disposed between the engine and a driving motor of the vehicle to interrupt transference of power from the engine to the driving motor; and charging the battery with power output from the HSG while the HSG is rotating by driving power output from the engine.

The generation of a charging request may be performed when state-of-charge (SOC) of the battery is lower than a preset value while the hybrid vehicle is traveling the EV mode. After the clutch pressure is released, the method may further include confirming whether the pressure of the clutch has been released and the battery may be charged when the pressure of the clutch has been released. In response to determining that the pressure of the clutch has not been released, the pressure of the clutch may again be performed.

DETAILED DESCRIPTION

Figure 1:
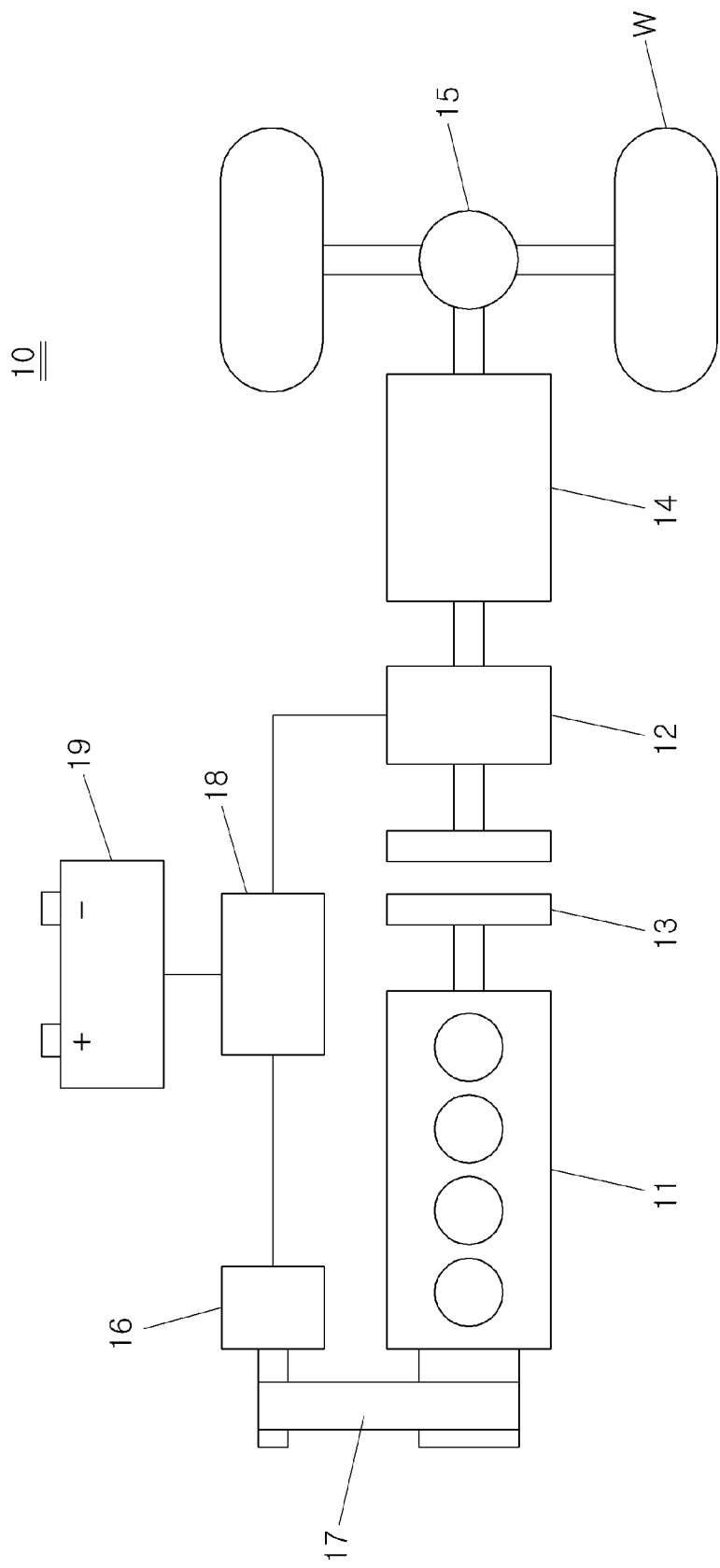
FIG. 1 is an exemplary block diagram illustrating the configuration of a conventional hybrid vehicle according to the related art.
Figure 2:
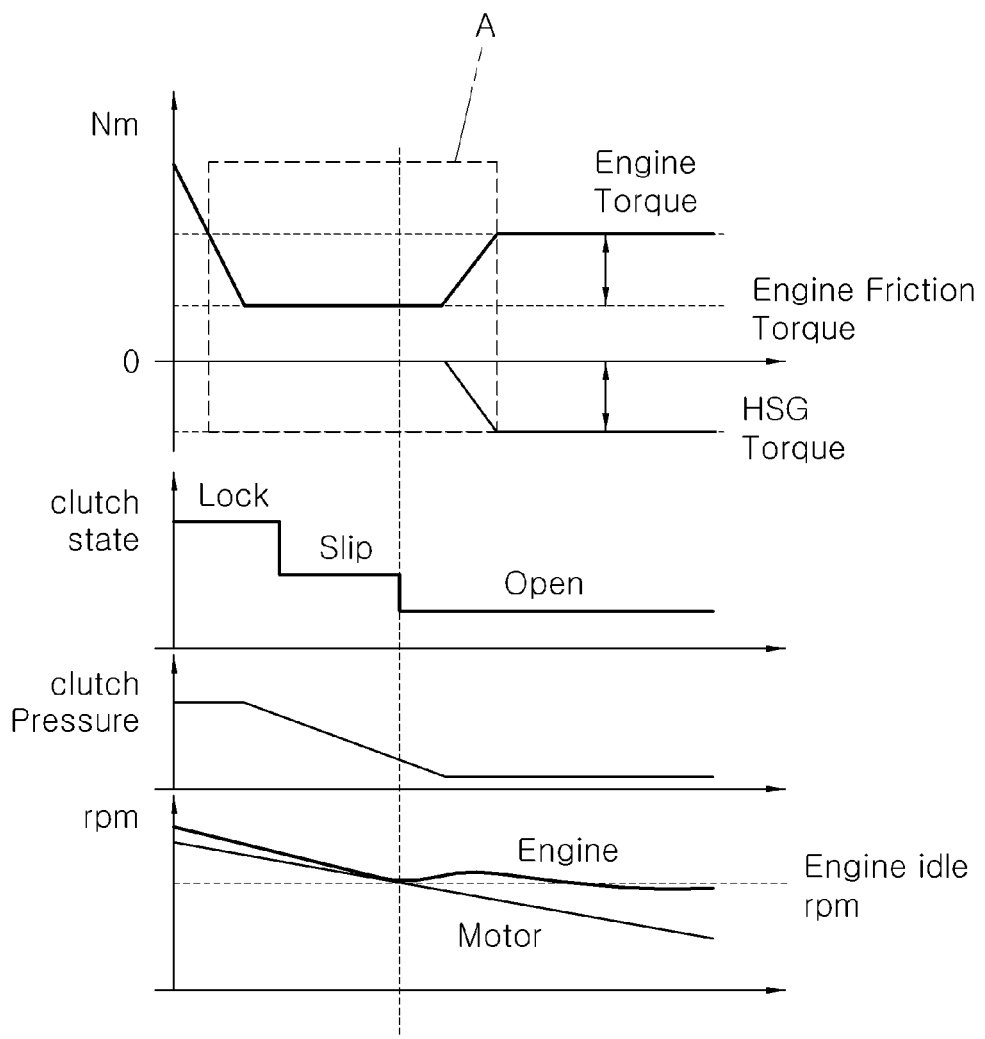
FIG. 2 is an exemplary graph illustrating engine torque, HSG torque, the state of a clutch, the pressure of the clutch, and the states of the RPMs of a driving motor and an engine during charging in a conventional hybrid vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention will be described below in more detail with reference to the accompanying drawings. The present invention may, however, be embodied in different forms and should not be construed as limited to the exemplary embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, a method for controlling the charging of a hybrid vehicle in accordance with an exemplary embodiment of the present invention will be described in detail with reference to the accompanying drawings. The method as described below may be executed by a controller having a processor and a memory.

Figure 3:
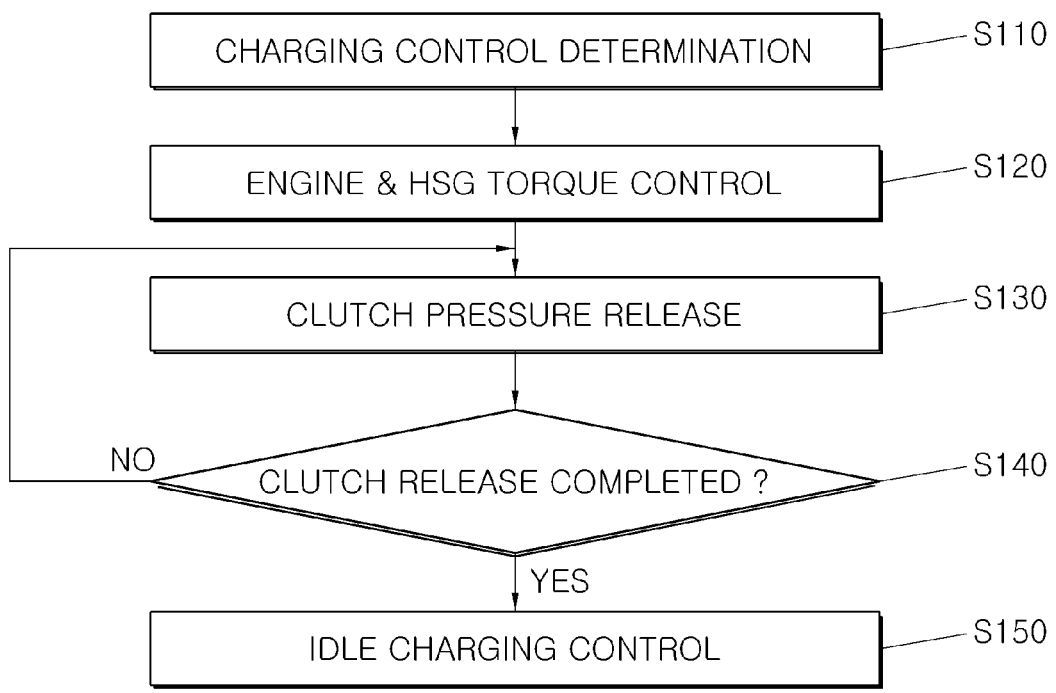
FIG. 3 is an exemplary flowchart showing a method for controlling the charging of a hybrid vehicle according to an exemplary embodiment of the present invention.

As shown in FIG. 3, a method for controlling the charging of a hybrid vehicle in accordance with an exemplary embodiment of the present invention may include: a generating, by a controller, a request to charge a battery 19 by driving a hybrid starter generator (HSG) 16 with the power of an engine 11 in an electric vehicle (EV) mode of a hybrid vehicle (S110); decreasing, by the controller, the torque of the engine 11 to HSG charging engine torque, which may be set as a level that corresponds with HSG charging torque, maintaining the torque of the engine 11 at the HSG charging engine torque, and shifting the torque of the HSG 16 into charging-target HSG torque (S120); releasing, by the controller, the pressure of a clutch disposed between the engine and a driving motor of the vehicle to interrupt the transference of power from the engine to the driving motor (S130); and charging, by the controller, the battery with power output from the HSG 16 while the HSG 16 is rotating by the driving power output from the engine (S150).

The controller may be configured to determine whether to charge the battery 19 by driving the HSG 16 with the power of the engine 11 in the electric vehicle (EV) mode of the hybrid vehicle. When the state of charge (SOC) of the battery 19 is lower than a preset value while the hybrid vehicle is traveling in the EV mode, a hybrid control unit (HCU), configured to determine a fuel injection timing, the torque of the engine 11, the torque of the HSG 16, the torque of the driving motor 12, and the pressure of the clutch, may be configured to perform a charging control to be described later.

The torque of the engine 11 may be adjusted to be HSG charging torque to charge the HSG 16, and the torque of the HSG 16 may be adjusted to be charging-target HSG torque. In addition, power transferred from the engine 11 to the driving motor 12 in the EV mode may be interrupted, and the torque of the engine 11 and HSG 16 may be adjusted to a predetermined value when charging the battery 19 with the HSG 16. In other words, the torque of the engine 11 may be decreased to preset HSG charging engine torque to drive the HSG 16 configured to generate electricity, and may be maintained at the preset HSG charging engine torque. In addition, the HSG 16 may be operated to be shifted into charging target torque which is preset for charging.

The pressure of the clutch 13 disposed between the engine 11 and the driving motor 12 may be released to interrupt the driving power transferred from the engine 11 to the driving motor 12. When the pressure of the clutch 13 is released, power may be prevented from being transferred through the clutch 13, to thus interrupt the power transference from the engine 11 to the driving motor 12, and the vehicle may travel in the EV mode. Whether the pressure of the clutch 13 has been released may be determined by the controller. In particular, the controller may be configured to whether the pressure of the clutch 13, which is operated by the HCU, has been completely released to interrupt the power transferred from the engine 11 to the driving motor 12. In response to determining that the pressure of the clutch 13 has not been completely released, the process may return to the clutch pressure release process S130.

Figure 4:
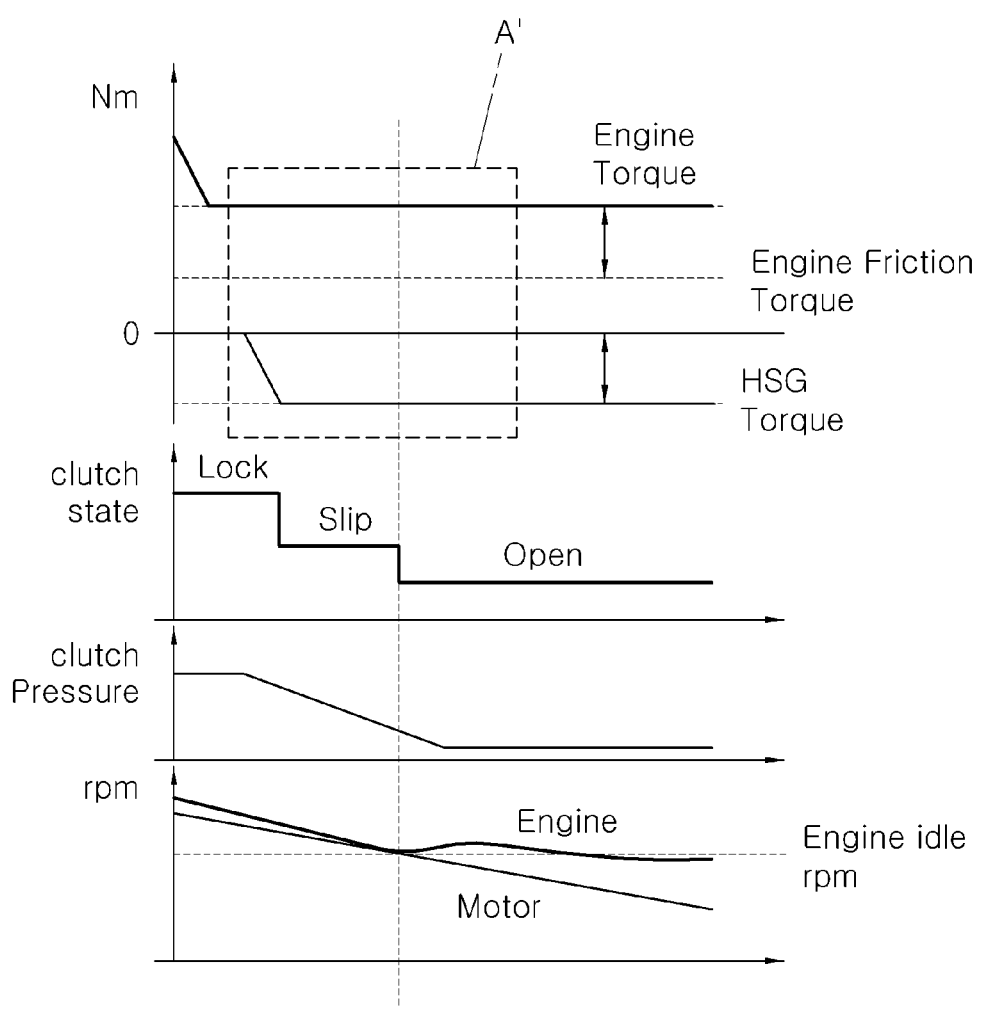
FIG. 4 is an exemplary graph illustrating engine torque, HSG torque, the state of a clutch, the pressure of the clutch, and the states of the RPMs of a driving motor and an engine during charging in a hybrid vehicle according to the method for controlling the charging of the hybrid vehicle according to an exemplary embodiment of the present invention.

In an idle state of the engine 11, i.e. in an EV state in which the vehicle does not travel by the engine 11, the engine 11 may be configured to operate at a degree to drive the HSG 16 to charge the battery 19 of the vehicle. Since charging may be performed when the torque of the engine 11 and HSG 16 are adjusted to be profitable for charging, it may be possible to prevent the deterioration of the system efficiency caused by increasing the torque of the engine 11 to a degree that corresponds with the starting motor-electricity generation charging torque after the clutch 13 has been released. In other words, as indicated by "A" in FIG. 4, since the driving torque of the engine 11 may increase to cope with the charging torque of the HSG before the clutch 13 is released (e.g., to drive the HSG before the release), the deterioration of the system efficiency may be prevented.

According to the method for controlling charging in a hybrid vehicle in accordance with the exemplary embodiments of the present invention, when it is necessary to charge a battery in the hybrid vehicle, the driving torque of an engine may be increased to HSG driving torque capable of driving an HSG in an EV mode before a clutch disposed between the engine and a motor is released, and then the clutch may be released, to prevent the engine from operating in an inefficient section. Since the engine may be prevented from operating in an inefficient section, as described above, the fuel efficiency of the vehicle may be improved.

While the present invention has been described with respect to the specific exemplary embodiments, it will be apparent to those skilled in the art that various changes and modifications may be made without departing from the spirit and scope of the invention as defined in the following claims.

What is claimed is:

1. A method for controlling charging of a hybrid vehicle, comprising:
    generating, by a controller, a request to charge a battery by driving a hybrid starter generator (HSG) with power of an engine in an electric vehicle (EV) mode of the hybrid vehicle;
    decreasing, by the controller, torque of the engine to HSG charging engine torque, maintaining the torque of the engine at the HSG charging engine torque, and shifting torque of the HSG into charging-target HSG torque;
    releasing, by the controller, a pressure of a clutch disposed between the engine and a driving motor of the vehicle to interrupt transference of power from the engine to the driving motor;
    charging, by the controller, the battery with power output from the HSG while the HSG is rotating by driving power output from the engine; and
    confirming, by the controller, whether the pressure of the clutch has been released, after releasing the pressure the clutch,
    wherein the generation of a request to charge a battery by driving a hybrid starter generator (HSG) with power of an engine in an electric vehicle (EV) mode of the hybrid vehicle is performed when state-of-charge (SOC) of the battery is lower than a preset value while the hybrid vehicle is traveling the EV mode,
    wherein the charging the battery with power output from the HSG while the HSG is rotating by driving power output from the engine is performed when the pressure of the clutch has been released, and
    wherein when the pressure of the clutch has not been released a return is performed to the release the pressure of the clutch to interrupt transference of power from the engine to the driving motor.

2. A system for controlling charging of a hybrid vehicle, comprising:
    a memory configured to store program instructions; and
    a processor configured to execute the program instructions, the program instructions when executed configured to:
    generate a request to charge a battery by driving a hybrid starter generator (HSG) with power of an engine in an electric vehicle (EV) mode of the hybrid vehicle;
    decrease torque of the engine to HSG charging engine torque, maintain the torque of the engine at the HSG charging engine torque, and shift torque of the HSG into charging-target HSG torque;
    release a pressure of a clutch disposed between the engine and a driving motor of the vehicle to interrupt transference of power from the engine to the driving motor;
    charge the battery with power output from the HSG while the HSG is rotating by driving power output from the engine; and
    confirm whether the pressure of the clutch has been released, after releasing the pressure the clutch,
    wherein the generation of a request to charge a battery by driving a hybrid starter generator (HSG) with power of an engine in an electric vehicle (EV) mode of the hybrid vehicle is performed when state-of-charge (SOC) of the battery is lower than a preset value while the hybrid vehicle is traveling the EV mode,
    wherein the charging the battery with power output from the HSG while the HSG is rotating by driving power output from the engine is performed when the pressure of the clutch has been released, and
    wherein when the pressure of the clutch has not been released a return is performed to the release the pressure of the clutch to interrupt transference of power from the engine to the driving motor.

3. A non-transitory computer readable medium containing program instructions executed by a controller, the computer readable medium comprising:
    program instructions that generate a request to charge a battery by driving a hybrid starter generator (HSG) with power of an engine in an electric vehicle (EV) mode of the hybrid vehicle;
    program instructions that decrease torque of the engine to HSG charging engine torque, maintain the torque of the engine at the HSG charging engine torque, and shift torque of the HSG into charging-target HSG torque;
    program instructions that release a pressure of a clutch disposed between the engine and a driving motor of the vehicle to interrupt transference of power from the engine to the driving motor;
    program instructions that charge the battery with power output from the HSG while the HSG is rotating by driving power output from the engine; and
    program instructions that confirm whether the pressure of the clutch has been released, after releasing the pressure the clutch,
    wherein the generation of a request to charge a battery by driving a hybrid starter generator (HSG) with power of an engine in an electric vehicle (EV) mode of the hybrid vehicle is performed when state-of-charge (SOC) of the battery is lower than a preset value while the hybrid vehicle is traveling the EV mode,
    wherein the charging the battery with power output from the HSG while the HSG is rotating by driving power output from the engine is performed when the pressure of the clutch has been released, and
    wherein when the pressure of the clutch has not been released a return is performed to the release the pressure of the clutch to interrupt transference of power from the engine to the driving motor.

* * * * *